May 1, 1934.    R. R. SEARLES    1,957,001
CLOSURE RING FOR BEARINGS
Filed May 17, 1928
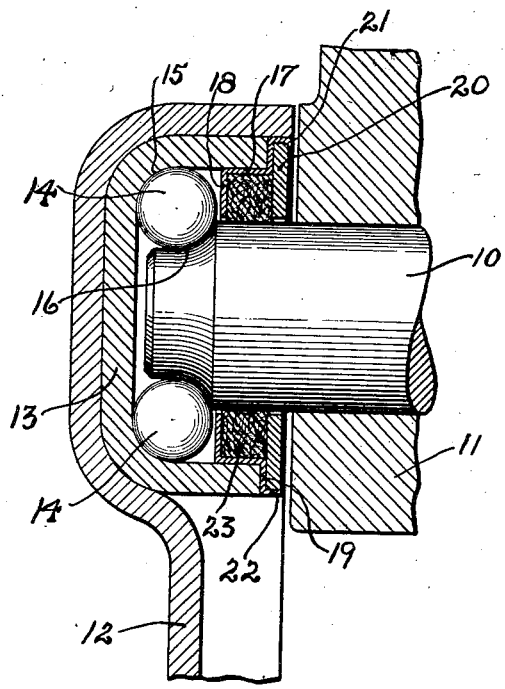
INVENTOR.
R. R. SEARLES
BY
Mitchell + Bechert
ATTORNEYS.

Patented May 1, 1934

1,957,001

UNITED STATES PATENT OFFICE 1,957,001

CLOSURE RING FOR BEARINGS

Raymond R. Searles, New Britain, Conn., assignor to The Fafnir Bearing Company, New Britain, Conn., a corporation of Connecticut Application May 17, 1928, Serial No. 278,465

1 Claim. (Cl. 286—5)

This invention relates to a bearing, and more particularly to a closure means for retaining lubricant in and excluding dust from a bearing.

The principal object of the present invention is to provide an improved lubricant retaining closure and dust excluding means for a bearing.

With the above and other objects in view, my invention consists in the features of construction and operation set forth in the following specification and illustrated in the accompanying drawing.

In the accompanying drawing annexed hereto and forming a part of this specification, I have shown my invention embodied in a closure or dust ring for an antifriction bearing, but it will be understood that the invention can be otherwise embodied, and that the drawing is not to be construed as defining or limiting the scope of the invention, the claim appended to this specification being relied upon for that purpose.

In the drawing, the figure shows a cross sectional view of one form of bearing provided with the improved form of dust excluding and lubricant retaining closure ring.

In the above mentioned drawing, I have shown but one embodiment of the invention which is now deemed preferable, but it is to be understood that changes and modifications may be made within the scope of the appended claim without departing from the spirit of the invention.

Referring more in detail to the drawing wherein the closure ring is used on a shackle, I provide a shackle pin 10, one end only of which is shown, extending through a portion of an automobile side frame 11. A shackle link 12 is adapted at its lower end (not shown) to engage a spring end or other part having limited movement relative to the shackle link 12 and frame 11. The upper end of this link 12, which is that shown in the drawing, is connected to one end of the shackle pin 10. The shackle pin 10 forms the journal of an antifriction or other bearing, and the shackle link forms the bearing member therefor.

The end of the shackle link 12 is provided with a cup shaped member 13 housed therein closely contacting with the suitably formed inside surfaces of the shackle member or link 12. The cup member 13 is made of one piece suitably forged or stamped into form and open at its inner end. Disposed between the cup shaped member 13 and the end of the shackle pin 10 are a plurality of balls 14 fitting the raceways 15 and 16.

Inserted within the open end of the cup shaped bearing race member 13 is a closure member or ring 17, a cylindrical portion thereof being held friction-tight within the cup-shaped member 13. An inwardly extending flange 18 forming the innermost portion of the closure member 17 loosely surrounds the cylindrical surface of the shackle pin 10. An outwardly extending flange 19 also integrally formed on the closure member or ring 17 bears directly against the inner end face of the cup shaped member 13 and serves as a means to position the flange 18 away from the elements 14. Adapted to contact with this flange 19 and to loosely surround the cylindrical surface of the shackle pin 10 is a relatively heavy ring or disc 20 adapted to be retained in fixed position by an inwardly crimped portion 21 of an outer cylindrical portion 22 adjacent the outwardly extending flange 19. The ring or disc 20 is made sufficiently heavy and rigid to prevent distortion or deflection when in use.

It will be seen from this construction that there is a relatively wide open space provided between the internal flange 18 and the inside face of the disc or ring 20. Within this space is adapted to be inserted before the disc 20 is placed in position a thick felt ring or washer 23 which is held from endwise escape by the flange 18 and ring 20. The inner cylindrical surface of this washer 23 closely contacts with the cylindrical portion of the shackle pin 10. The space surrounding the antifriction members or balls 14 and between the integral end face of the cup shaped member 13 and the inwardly extending flange 18 of the closure member or ring 17 is suitably filled with lubricant. The felt washer or ring 23, therefore, serves to effectually retain lubricant within the space surrounding the antifriction members 14, and also effectively serves to prevent the admission of dust or foreign matter to the lubricant cavity within the cup shaped member 13.

The closure herein illustrated is not likely to get out of order. The parts are securely held together and, due to the thickness and consequent rigidity of the ring 20 and the clearance between said ring and the pin 10, there is little likelihood that the latter will at any time be sprung or snapped from its seat in the cylindrical portion 22 due to any slight tilting movement between the pin 10 and the bearing cup 13.

The improved closure means herein described may be easily and cheaply manufactured from sheet metal by simple stamping or pressing operations, and by means of the present closure lubricant will be effectually held in, and dust excluded from the bearing.

I claim:

In a bearing closure, an outer bearing ring, a sheet metal ring fitting the inner surface of said bearing ring with a tight frictional fit, a radially inwardly extending flange at the inner side of said sheet metal ring, an outwardly extending flange on said sheet metal ring and abutting the edge of said bearing ring, a closure washer abutting said flange, said flange and closure washer having a solid bearing against the edge of said bearing ring, means for securing said washer to said flange, and a dust ring in said sheet metal ring and interposed between said washer and said radially inwardly extending flange, said parts being rigidly held to said outer bearing ring by the tight frictional fit aforesaid.

RAYMOND R. SEARLES.